7/5/77 XR 4,034,255

United States Patent [19]

Catanese et al.

[11] 4,034,255

[45] July 5, 1977

[54] VANE STRUCTURE FOR A FLAT IMAGE DISPLAY DEVICE

[75] Inventors: Carmen Anthony Catanese, Rocky Hill; John Guiry Endriz, Plainsboro; Jan Aleksander Rajchman, Princeton, all of N.J.

[73] Assignee: RCA Corporation, New York, N.Y.

[22] Filed: Nov. 28, 1975

[21] Appl. No.: 636,095

[52] U.S. Cl. .......................... 313/400; 313/105 R; 313/422

[51] Int. Cl.[2] .................. G01J 31/48; H01J 43/20; H01J 29/70

[58] Field of Search .... 313/103 R, 103 CM, 105 R, 313/105 CM, 400, 409, 414, 422, 411, 417; 315/169 TV; 340/324 M; 328/242, 243

[56] References Cited

UNITED STATES PATENTS

| | | | |
|---|---|---|---|
| 2,646,521 | 7/1953 | Rajchman | 313/400 |
| 3,505,559 | 4/1970 | Jeffries et al. | 313/105 R X |
| 3,519,870 | 7/1970 | Jensen | 313/105 CM |
| 3,735,184 | 5/1973 | Maeda | 313/105 R |
| 3,825,922 | 7/1974 | Ralph | 313/103 R X |
| 3,904,923 | 9/1975 | Schwartz | 313/105 R X |
| 3,925,703 | 12/1975 | Schermerhorn | 315/169 TV |
| 3,938,133 | 2/1976 | Miller | 340/324 M |
| 3,940,757 | 2/1976 | Purchase | 340/324 M |

FOREIGN PATENTS OR APPLICATIONS

| | | | |
|---|---|---|---|
| 2,263,614 | 7/1974 | Germany | 313/103 R |

*Primary Examiner*—Gerard R. Strecker
*Attorney, Agent, or Firm*—Glenn H. Bruestle; Carl L. Silverman; Dennis H. Irlbeck

[57] ABSTRACT

The structure comprises an evacuated envelope that includes a transparent front panel having a cathodoluminescent screen thereon and a back panel interconnectably sealed to the front panel. A plurality of first vanes, spaced from and parallel to each other, are perpendicular to and in contact with the back panel and a plurality of second vanes, spaced from and parallel to each other, are perpendicular to and in contact with the front panel. The first and second vanes are transverse to each other and provide mutual support for each other. Electroding to control operation of the device is formed directly on the vanes.

10 Claims, 5 Drawing Figures

VANE STRUCTURE FOR A FLAT IMAGE DISPLAY DEVICE

BACKGROUND OF THE INVENTION

This invention relates to a flat, large area image display apparatus or device, such as for displaying television, alpha-numeric or other images, and particularly to an internal structure for such a display device of the cathodoluminescent type.

Cathodoluminescent display have been suggested wherein the electron source is a multidynode electron multiplier operated in an ion feedback mode. The structure of such a device can be extremely complicated when made according to standard multiplier technologies. If such or similar devices are to find practical application for large area displays, there is a need for less complicated display device design. The present invention provides a simplified device design wherein a novel internal support structure also serves as a substrate for the electroding required for device operation.

SUMMARY OF THE INVENTION

A structure for an image display device comprises an evacuated envelope that includes a transparent front panel having a cathodoluminescent screen thereon and a back panel interconnectably sealed to the front panel. A plurality of first vanes, spaced from and parallel to each other, are in edge contact with the back panel and a plurality of second vanes, spaced from and parallel to each other, are in edge contact with the front panel. The first and second vanes are transverse to and in edge-to-edge contact with each other, thereby providing mutual support for said front and back panels. Electroding to control operation of the device is formed directly on the vanes.

DETAILED DESCRIPTION

Figure 1:
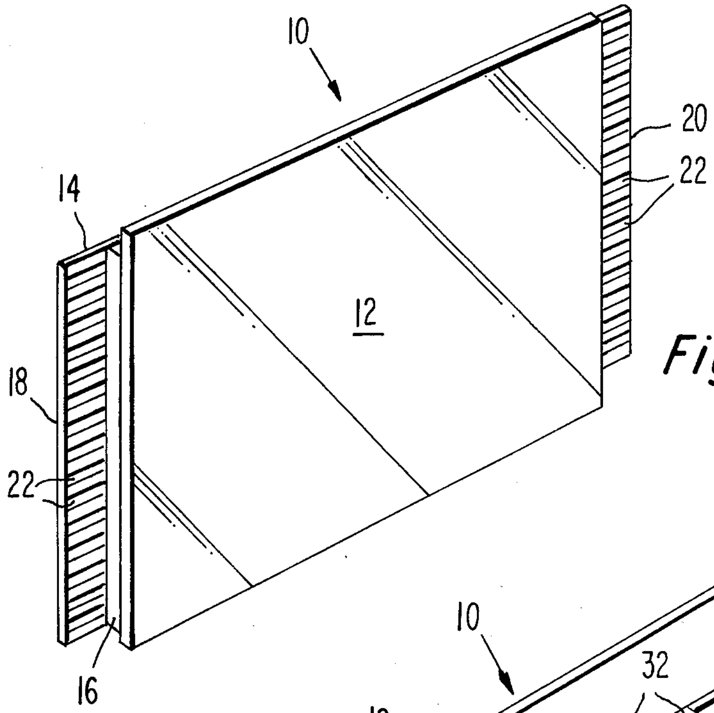
FIG. 1 is a perspective view of a flat television display device.

A complete flat television display device 10 is shown in FIG. 1. This device comprises an evacuated glass envelope having a flat transparent viewing front panel 12 and a flat back panel 14. The front and back panels 12 and 14 are parallel to each other and are sealed together by peripheral sidewalls 16. The back panel 14 extends beyond each side of the device to form two terminal areas 18 and 20, each having a plurality of leads 22 which interconnect to internal components for activating and controlling the device. In one embodiment, the overall dimensions of the device 10 may be 84 cm. high by 112 cm. wide by 3 cm. thick. The viewing area of this size device is 76 cm. by 102 cm.

Figure 2:
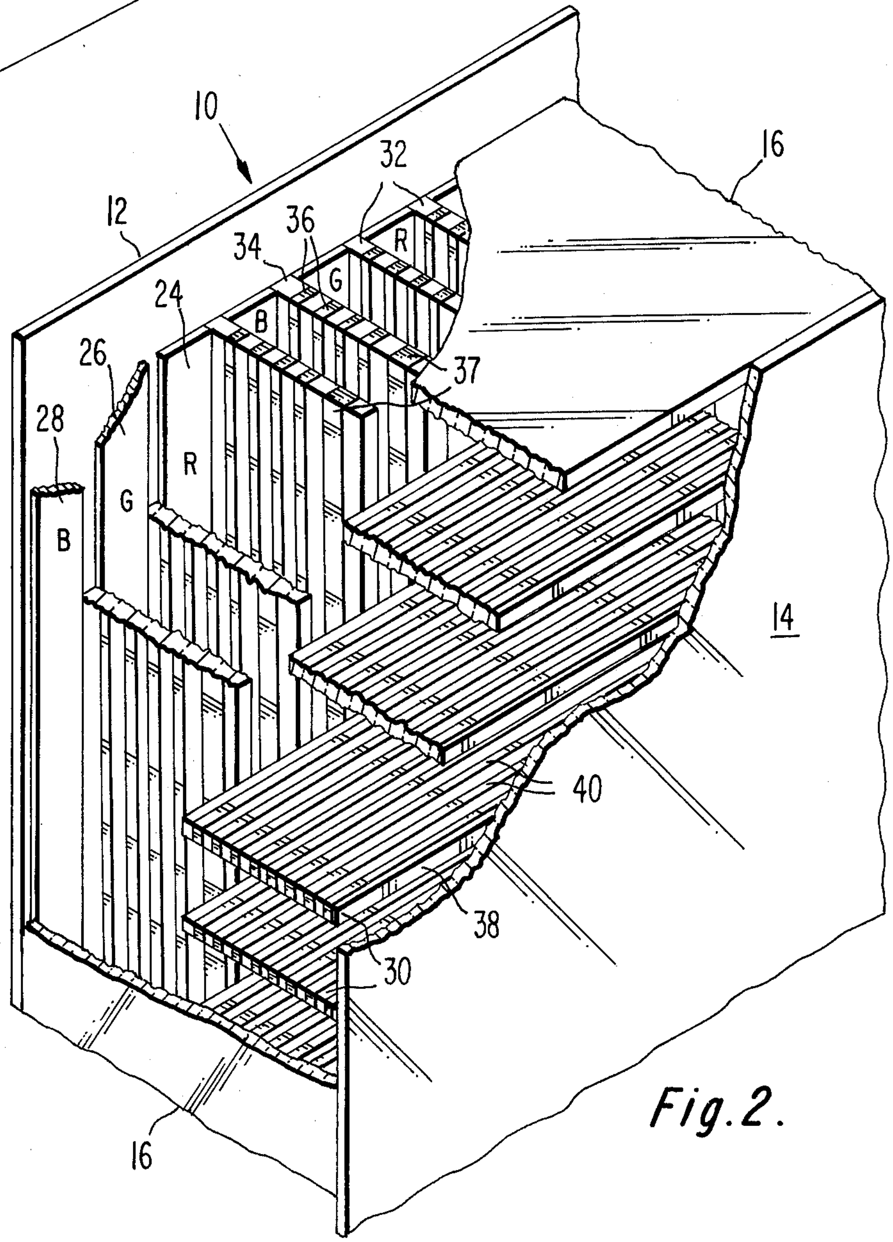
FIG. 2 is a partial cut-away view of a corner of the device of FIG. 1.

The internal structure of the device 10 is shown in the cut-away view of FIG. 2. The back panel 14 preferably comprises a metallized pattern on an insulator plate, such as glass, or it may also be solid metal. The inside surface of the back panel 14 further may be overcoated with a thin layer of a material that provides a high electron emission under ion bombardment. Several materials, such as MgO and BeO, known as good emitters, can be coated onto the back panel 14 by a variety of techniques; e.g., sputtering or evaporation of the component metal followed by oxidation.

The front panel 12 is a transparent sheet, preferably glass, that serves as the viewing faceplate of the device 10. The internal surface of the front panel 12 as covered with a mosaic screen comprising alternating red, green and blue emitting phosphor strips, 24, 26 and 28, respectively.

The front and back panels 12 and 14 are separated by two sets of vanes, a set of multiplier vanes 30 and a set of accelerator vanes 32. The vanes within each set are parallel to and spaced from each other but are perpendicular to both the front and back walls 12 and 14 and to each other. The multiplier vanes 30 contact the back panel 14 and are perpendicular to the accelerator vanes 32 which in turn contact the front panel 12. The two sets of vanes contact each other and thus mutually support the front and back panels 12 and 14. It is this intrasupport that provides a structure of sufficient rigidity to withstand the force of atmospheric pressure when the device is evacuated or at least partially evacuated.

Figure 3:
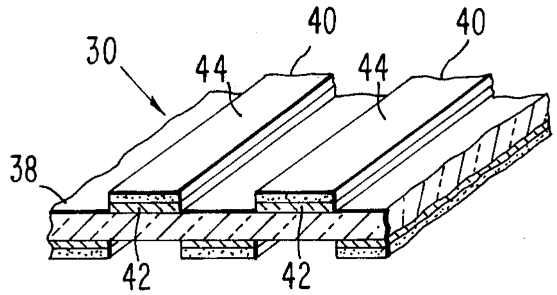
FIG. 3 is a sectional perspective view of a multiplier vane of the device of FIG. 1.

The accelerator vanes 32 are formed from flat strips 34 of insulating material, such as glass, or ceramic, that are coated with conductive patterns 36 constituting electrodes for modulating, accelerating and focussing electron beams. The multiplier vanes 30 are similarly formed from flat strips 38 of insulating material coated with conductive patterns 40. These patterns are further coated with a material, such as MgO, having high secondary emission characteristics, to constitute the electrodes of a line multiplier wherein each coated strip is a dynode of the multiplier. A cross-sectional view of a portion of one multiplier vane is shown in FIG. 3. A first layer 42, approximately 0.025 mm. thick, of electrically conductive material is selectively applied by masked evaporation or screening to the insulating surface of the vane 30. A second layer 44 of approximately 500A of secondary emitting material is coated over the first layer 42 preferably by solution spraying or oxidation of evaporated material.

The number of multiplier vanes 30 is related to the number of scan lines desired. In the United States, for example, the NTSC standard for television comprises 525 lines. Of these 525 lines, up to 42 lines may be used for blanking. Therefore, a minimum television display under present standards would include 483 scan lines of video information. Thus, at least 484 multiplier vanes or some multiple thereof is required for complete display of the video information. Similarly, the device may be constructed with other numbers of horizontal multiplier vanes to match the television standards of other countries. In a display device having external dimensions of approximately 84 cm. by 112 cm., the multiplier vanes 30 are 102 cm. long, about 1 cm. wide, 0.76 mm. thick and spaced about 0.76 mm. apart. Regardless of the number of multiplier vanes, there may be any number of vertical accelerator vanes 32, however, from 1920 to 2220 vertical vanes are sufficient to provide adequate resolution in most practical tri-color devices having 484 horizontal multiplier vanes. In the illustrated embodiment, the accelerating vanes 32 are 76 cm. long, about 1 cm. wide and 0.25 mm. thick.

Figure 4:
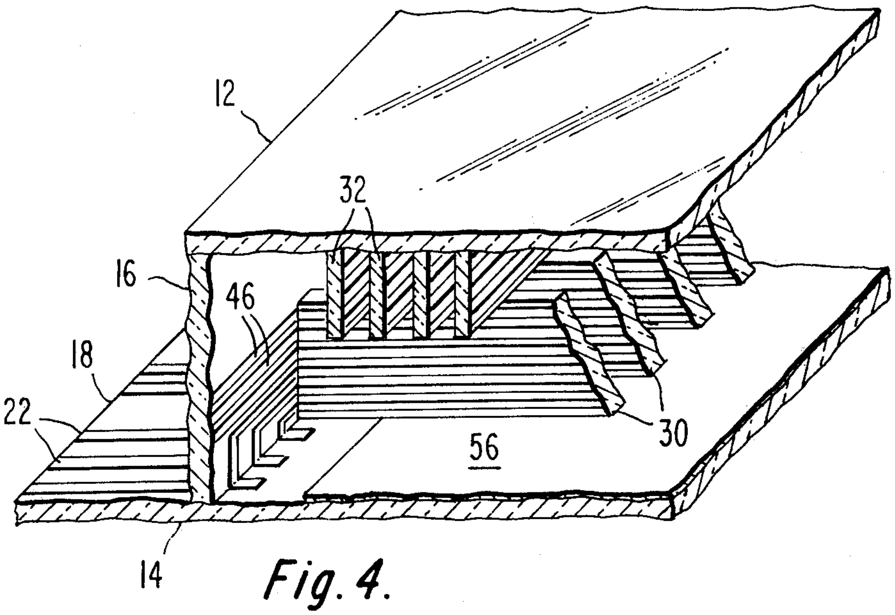
FIG. 4 is a partial cut-away view of a terminal area of the device of FIG. 1.

Interconnection between the conductive patterns 36 or 40 on the vanes and the therminal leads 22 on the back panel 14 can be made in various ways. In one embodiment, the electrode strips 40 of the multiplier vanes 30 overlap the ends of the vanes, as shown in FIG. 2, and contact another electrode pattern 46 on a tube sidewall 16 as shown in FIG. 4. Portions of the pattern 46 bend and extend around the edge of the sidewall 16 to contact the leads 22.

Figure 5:
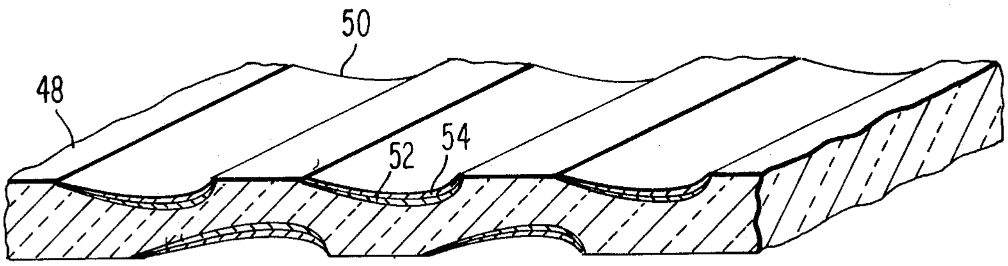
FIG. 5 is a cut-away perspective view of another embodiment of multiplier vanes.

An alternate embodiment of the multiplier vanes is shown in FIG. 5. In this embodiment, multiplier vanes 48 are shaped to achieve surfaces having concave channels 50 therein. Each channel 50 is covered with an electrically conductive material 52 which is overcoated with a second layer 54 of a material having high secondary emission characteristics as in the preceeding embodiment.

In the device 10, the parallelepiped-shaped space defined by the four planes containing two adjacent multiplier vanes 30 and two adjacent accelerator vanes 32 constitutes one cell of an array of cells. Each cell includes the necessary components for forming at least a single element of an image display. Generally, a cell comprises a priming source of electrons, which hereinafter will be referred to as the cathode, a multidynode electron multiplier of appropriate structure and of sufficiently high gain to produce regenerative feedback wherein the loop gain of the multiplier is greater than unity, modulation means for controlling the amount of electrons emitted from the multiplier, means for accelerating and focussing a stream of electrons, and a cathodoluminescent screen.

The inside surface of the back panel 14 serves as an unheated cathode 56 for the device. The cathode 56 provides the input electrons for the multiplier. For operation, voltages are applied to the multiplier dynodes that increase in level from the dynode closest to the cathode to the dynode closest the multiplier output. For example, in the embodiment described herein, dynode to dynode voltage increases of 300 volts permit acceptable multiplier operation. The multiplier is initially fired or started by priming electrons emitted from the cathode which may be caused by cosmic or other external radiation impinging thereon or by other causes. The electron current emitted from the cathode 56 (FIG. 4) is amplified through the very large gain of the multiplier. Under the conditions of an open electron multiplier structure wherein a clear (unobstructed) passage exists from the cathode to the multiplier output as shown in FIGS. 2 and 4, a large buildup of current will occur. This buildup is dependent on the fact that the high current in the last stages of the multiplier produces ionization of the residual gas within the envelope of the apparatus. Some ionization occurs even in a so-called excellent vacuum, for example $10^{-5}$ Torr (mm.Hg.). While the number of ions is small, the positive ions that are produced are accelerated toward the back panel 14 to bombard the cathode 56 where they release more electrons to the multiplier. Current buildup continues until the effect of space charge begins to limit the multiplier output. The multiplier gain can easily be millions if a sufficient number of multiplier stages are used. For example, if the multiplier has 10 stages, and each stage has a gain of 4, the total gain of the multiplier would be more than 1 million. However, if a high yield secondary emitter such as magnesium oxide were used, fewer stages would be sufficient to obtain a total gain of over a million.

To be useful as a television image display, the output electrons of the multiplier must be controlled. On-off control of any line of cells can be easily effected by changing potentials on any dynode strip to values that do not support current buildup. Preferably more than one dynode can be controlled to ensure complete cut-off. Gray-scale modulation (i.e., a selective gradation of the number of electrons allowed to strike each phosphor stripe on the screen) can be obtained by the use of controlling electrodes or modulators 37 placed at the multiplier output on each of the accelerator vanes 32. These modulators 37 can be used in several ways to control the electron flow. For example, the passage of electrons through an electro-optic modulator lens in the accelerator may be space charge limited. Space charge limitation can be considered to be that level of saturation of electron passage wherein no further electrons can fit through the opening of the electro-optic lens. The level of saturation or space charge limitation will depend on the video signal applied to each modulator 37. Therefore, the number of electrons permitted to strike various phosphor strips on the screen can be controlled by varying the potentials applied to the various modulators.

The electrons that pass through the modulator are next further accelerated toward the screen and focussed by the remaining electrodes to provide an appropriately sized electron beam spot on the screen. Acceleration is accomplished by providing increasingly more positive potentials on the electrodes as the screen is approached. Such potential distribution is also useful to reduce electrical break-down between electrodes. By suitable design, these same electrodes provide focussing of the electrons into the required electron beam.

Since the multiplier dynodes are formed in strips, the multiplier sections of all cells in a horizontal line can be activated simultaneously. The multiplier structure for this arrangement therefore is called a line multiplier. The device is operated by activating the line multipliers on the multiplier vanes 30 in sequence and by applying the appropriate modulation signals to the modulators.

Although the foregoing embodiment of a flat image display device is shown with a particular electrode arrangement therein, the basic structure permits many variations in electroding. Different electrode widths, locations and potential distributions can easily be accomplished by variations in the electrode patterns.

Since, in the described embodiments, the crossed vanes define a cell of the device, there is no registration problem with the exception of registering the accelerating vanes with respect to the screen lines. Furthermore, since the internal structure is open, the disclosed device can be easily pumped down to a vacuum.

It should be understood that although the foregoing structure has been described with respect to a display device that uses an electron multiplier as an electron source, the scope of the invention also includes display devices having other types of electron sources, e.g., an array of field emitter tips, thermionic button cathodes or other types of area cathodes.

We claim:

1. A structure for an image display device comprising, an evacuated envelope including a transparent front panel and a back panel spaced from said front panel, said front panel having a cathodoluminescent screen thereon, a plurality of first vanes substantially perpendicular to and contacting and back panel, said first vanes being spaced from and parallel to each other, a plurality of second vanes, substantially perpendicular to and contacting said front panel, said second vanes being spaced from and parallel to each other and transverse to said first vanes, said first and second vanes being mutually supporting, and said first and second vanes having electroding thereon for controlling operation of said device.

2. The image display device structure as defined in claim 1, including said first and second vanes being substantially mutually perpendicular.

3. A structure for an image display device comprising, a front panel, a back panel spaced from and parallel to said front panel, a plurality of first vanes of electrically insulative material substantially perpendicular to and contacting said back panel, said first vanes being spaced from and parallel to each other, a plurality of second vanes of electrically insulative material substantially perpendicular to and contacting said front panel and said first vanes, said second vanes being spaced from and parallel to each other, said second vanes being substantially perpendicular to said first vanes, a first pattern of conductive strips on said first vanes and a second pattern of conductive strips on said second vanes, said patterns providing means for operation and control of said device.

4. The structure as defined in claim 3, wherein the electrically insulative material of said first and second vanes is a material selected from the group consisting of glass or ceramic.

5. A structure for an image display device comprising, a transparent front panel having a plurality of electron excitable phosphor deposits thereon, a back panel spaced from and parallel to said front panel, said back panel including an electrically conductive surface facing said front panel, a plurality of first vanes contacting said back panel, said first vanes extending toward said front panel and being spaced from and parallel to each other, a plurality of second vanes contacting said front panel and said first vanes, said second vanes extending toward said back panel and being spaced from and parallel to each other, said second vanes being perpendicular to said first vanes, a first series of conductive strips on said first vanes, for multiplying the electron current emitted from said back panel, each strip of said first series being parallel to said back panel and to each other, and a second series of conductive strips on said second vanes of modulating and accelerating the electron current emitted from the multiplier to strike said phosphor deposits, each strip of said second series being parallel to said front panel and to each other.

6. The structure as defined in claim 5, wherein said phosphor deposits include at least two different phosphor materials, each phosphor material capable of emitting light of a different color when excited by electrons.

7. The structure as defined in claim 6, including each of said phosphor deposits being a phosphor strip positioned between adjacent second vanes.

8. A structure for an image display device comprising, a front panel having a phosphor screen thereon, a back panel spaced from and parallel to said front panel, said back panel including an electrically conductive surface facing said front panel, a plurality of flat first vanes perpendicular to and contacting said back panel, said first vanes extending toward said front panel and being spaced from and parallel to each other, a pattern of parallel conductive strips on said first vanes for multiplying the number of electrons emitted from the said back panel, each of said strips on said first vanes being parallel to said back panel;

a plurality of flat second vanes perpendicular to and contacting said front panel and first vanes, said second vanes extending toward said back panel and being spaced from and parallel to each other, and a pattern of parallel conductive strips on said second vanes for modulating and accelerating a flow of electrons toward said front panel, each of said strips on said second vanes being parallel to said front panel.

9. A structure in accordance with claim 1 which said electroding on said first vanes comprises conductive strips for multiplying electrons from said back panel and said electroding on said second vanes comprises conductive strips for modulating and accelerating said multiplied electrons to said cathodoluminescent screen.

10. A structure in accordance with claim 9 which includes means for establishing electrical potentials to said electroding so as to excite different portions of said cathodoluminescent screen.

* * * * *